US011786956B2

(12) United States Patent
Scholey et al.

(10) Patent No.: US 11,786,956 B2
(45) Date of Patent: Oct. 17, 2023

(54) SYSTEM AND METHOD FOR AUTOMATED LOW-SPEED POSITIONING OF A CAN NECKING MACHINE

(71) Applicant: Stolle Machinery Company, LLC, Centennial, CO (US)

(72) Inventors: Ian Kenneth Scholey, Barnsley (GB); Stephen Dane Christensen, Highlands Ranch, CO (US); Jonathan Scott Saunders, Jr., Englewood, CO (US); Andrew Christopher Hyde, Carlisle (GB)

(73) Assignee: Stolle Machinery Company, LLC, Centennial, CO (US)

( * ) Notice: Subject to any disclaimer, the term of this patent is extended or adjusted under 35 U.S.C. 154(b) by 301 days.

(21) Appl. No.: 17/320,672

(22) Filed: May 14, 2021

(65) Prior Publication Data
US 2022/0362832 A1  Nov. 17, 2022

(51) Int. Cl.
*G05B 19/04* (2006.01)
*B21D 51/26* (2006.01)
(Continued)

(52) U.S. Cl.
CPC ..... *B21D 51/2638* (2013.01); *B21D 51/2692* (2013.01); *G05B 19/0405* (2013.01);
(Continued)

(58) Field of Classification Search
USPC ......................................................... 700/145
See application file for complete search history.

(56) References Cited

U.S. PATENT DOCUMENTS

| 4,331,014 A | 5/1982 | Miller et al. |
| 5,400,564 A * | 3/1995 | Humphries ............... B67B 3/26 53/308 |

(Continued)

FOREIGN PATENT DOCUMENTS

| AT | 519166 A2 | 4/2018 |
| CN | 209191938 U | 8/2019 |

(Continued)

OTHER PUBLICATIONS

U.S. Patent and Trademark Office, PCT Application No. PCT/US22/27825, International Search Report and Written Opinion, dated Aug. 2, 2022, 8 pages.

*Primary Examiner* — Hien D Khuu
(74) *Attorney, Agent, or Firm* — Eckert Seamans Cherin & Mellott, LLC

(57) ABSTRACT

A system for performing necking operations on a can body includes a necker machine and a positioning system. The necker machine includes a frame; a processing arrangement having a plurality of components movable relative to the frame for performing the necking operations on the can body, and a drive motor having a shaft operatively coupled to the processing arrangement for moving the processing arrangement relative to the frame. The positioning system includes: an encoder associated with the drive motor for monitoring a rotational displacement of the shaft and a controller in communication with the encoder and the drive motor. The controller is structured and programmed to: receive an input from a user, the input being indicative of a desired movement of the processing arrangement relative to the frame, and to operate the drive motor using feedback from the encoder such that the desired movement of the processing arrangement is achieved.

13 Claims, 3 Drawing Sheets

(51) Int. Cl.
  *G05B 19/10* (2006.01)
  *G05B 19/048* (2006.01)

(52) U.S. Cl.
  CPC ....... *G05B 19/0415* (2013.01); *G05B 19/108* (2013.01); *G05B 19/048* (2013.01)

(56) References Cited

U.S. PATENT DOCUMENTS

| | | | |
|---|---|---|---|
| 5,419,094 A * | 5/1995 | Vander Bush, Jr. | B67B 3/2073 53/317 |
| 8,464,567 B2 | 6/2013 | Saville | |
| 8,578,760 B2 * | 11/2013 | Calhoun | G01M 3/32 73/49.3 |
| 8,601,843 B2 | 12/2013 | Dunwoody et al. | |
| 9,095,888 B2 | 8/2015 | Babbitt et al. | |
| 9,308,570 B2 | 4/2016 | Donwoody et al. | |
| 10,935,956 B2 | 3/2021 | Sato et al. | |
| 2008/0055241 A1 * | 3/2008 | Goldenberg | G06F 3/04812 345/156 |
| 2009/0045767 A1 * | 2/2009 | Bergeron | B27B 27/10 318/590 |
| 2009/0079712 A1 * | 3/2009 | Levin | G06F 3/016 345/184 |
| 2013/0199894 A1 | 8/2013 | Papsdorf | |
| 2014/0253718 A1 * | 9/2014 | Leitzen | G01N 21/909 348/86 |
| 2019/0224854 A1 | 7/2019 | Hanetseder et al. | |
| 2019/0344326 A1 * | 11/2019 | Mercer | B21D 51/2638 |
| 2019/0344977 A1 | 11/2019 | Mercer et al. | |
| 2022/0281628 A1 * | 9/2022 | Serpa | B65B 35/56 |

FOREIGN PATENT DOCUMENTS

| | | | |
|---|---|---|---|
| CN | 112105571 A * | 12/2020 | ............ B21D 43/18 |
| JP | 2020529677 A | 10/2020 | |
| WO | 9829206 A1 | 7/1998 | |
| WO | WO-2020076733 A1 * | 4/2020 | ........ B21D 51/2638 |

\* cited by examiner

SYSTEM AND METHOD FOR AUTOMATED LOW-SPEED POSITIONING OF A CAN NECKING MACHINE

BACKGROUND OF THE INVENTION

Field of the Invention

The disclosed and claimed concept relates to positioning systems and, more particularly, to positioning systems for can necking machines. The disclosed and claimed concept also relates to can necking machines including such systems as well as methods for positioning can necking machines.

Background Information

Can bodies are, typically, formed in a bodymaker. That is, a bodymaker forms blanks such as, but not limited to, disks or cups into an elongated can body. A can body includes a base and a depending sidewall. The sidewall is open at the end opposite the base. The bodymaker, typically, includes a ram/punch that moves the blanks through a number of dies to form the can body. The can body is ejected from the ram/punch for further processing such as, but not limited to, trimming, washing, printing, flanging, and inspecting, before being placed on pallets which are then shipped to a filler. At the filler, the cans are taken off of the pallets, filled, have ends placed on them, and then are typically repackaged in various quantities (e.g., six packs, twelve pack or other multi-can cases, etc.) for sale to the consumer.

Some can bodies after being formed in a bodymaker are further formed in a die necking machine, commonly referred to as simply a necker machine. Necker machines are structured to reduce the cross-sectional area of a portion of a can body sidewall, i.e., at the open end of the sidewall. That is, prior to coupling a can end to the can body (and prior to filling), the diameter/radius of the can body sidewall open end is reduced relative to the diameter/radius of other portions of the can body sidewall. The necker machine includes a number of processing and/or forming modules disposed in series. That is, the processing and/or forming modules are disposed adjacent to each other and a transfer assembly moves a can body between adjacent processing and/or forming modules.

When performing maintenance on a necker machine it is often required that the machine be positioned in a particular way. Such positioning is typically accomplished with some manual mechanism on the rear of the machine that allows an operator to wind the machine by hand. Such hand-winding of the machine has two primary disadvantages. First, the hand-wind mechanism is usually attached to the powertrain which is located at the rear of the machine. This means that the operator who is manually hand-winding the machine cannot see the position of the machine and requires a second operator to notify when the machine has reached the proper positioning. Second, hand-winding of a machine is a laborious process that requires appreciable effort and time.

SUMMARY OF THE INVENTION

Embodiments of the disclosed concept provides solutions to the aforementioned problems among other advantages over existing arrangements. As one aspect of the disclosed concept, a system for performing necking operations on a can body is provided. The system comprises: a necker machine comprising: a frame, a processing arrangement having a plurality of components movable relative to the frame, the processing arrangement structured to perform the necking operations on the can body, and a drive motor having a shaft operatively coupled to the processing arrangement for moving the processing arrangement relative to the frame; and a positioning system comprising: an encoder associated with the drive motor for monitoring a rotational displacement of the shaft; and a controller in communication with the encoder and the drive motor, wherein the controller is structured and programmed to: receive an input from a user, the input being indicative of a desired movement of the processing arrangement relative to the frame, and operate the drive motor using feedback from the encoder such that the desired movement of the processing arrangement is achieved.

The controller may comprise a human machine interface.

The positioning system may further comprise a human machine interface structured to receive the input from the user, and wherein the controller comprises a motor controller in communication with the human machine interface.

The desired movement of the processing arrangement may comprise a direction and magnitude of movement of a component of the processing arrangement relative to the frame.

The positioning system may further comprise a remote input device in communication with the controller, and the remote input device may be structured to receive the input from the user and provide the input to the controller.

The remote input device may comprise a knob or dial that is structured to be rotated by the user a rotational displacement in either of two rotatable directions from a stop position, wherein each rotatable direction corresponds to a movement direction of portions of the processing arrangement, and wherein the rotational displacement in either direction corresponds to a speed of the portions of the processing arrangement.

The controller may be further structured and programmed to operate the drive motor only while the knob or dial of the remote input device is rotated from the stop position by the user.

The drive motor may comprise a main drive motor that is sized and configured to move the processing arrangement relative to the frame while carrying out normal necking operations.

The drive motor may comprise a secondary drive motor, the system may further comprise a main drive motor operatively coupled to the processing arrangement that is sized and configured to move the processing arrangement relative to the frame while carrying out normal necking operations, and the secondary drive motor may be of a lessor size than necessary for carrying out normal necking operations.

The desired movement of the processing arrangement may correspond to a desired final positioning of a component of the processing arrangement relative to the frame.

The encoder may comprise a first encoder, the positioning system may further comprise a second encoder associated with a first component of the processing arrangement for monitoring a rotational position of the component with respect to the frame, the second encoder may be in communication with the controller for communicating the rotational position of the component to the controller, and the controller may be structured and programmed to determine the rotational position of the other components of the processing arrangement from the rotational position of the first component of the processing arrangement.

The desired movement of the processing arrangement may correspond to a desired final rotational positioning of a particular component of the processing arrangement relative to the frame, and the controller may be further programmed to: determine an initial rotational position of the particular component from the rotational position of the first component provided by the second encoder, determine a rotational displacement between the desired rotational positioning of the particular component and the initial rotational position of the particular component, and operate the drive motor using the feedback from the first encoder until the rotational displacement has been achieved according to the feedback from the first encoder.

The drive motor may comprise a main drive motor that is sized and configured to move the processing arrangement relative to the frame while carrying out normal necking operations.

The drive motor may comprise a secondary drive motor, wherein the system further comprises a main drive motor operatively coupled to the processing arrangement that is sized and configured to move the processing arrangement relative to the frame while carrying out normal necking operations, and wherein the secondary drive motor is of a lessor size than needed to carry out normal necking operations.

The positioning system may further comprise a safety encoder in communication with the controller, and the safety encoder may be associated with a component of the processing arrangement for monitoring one or both of a rotational acceleration and/or rotational speed of the component with respect to the frame.

These and other objects, features, and characteristics of the disclosed concept, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed concept.

BRIEF DESCRIPTION OF THE DRAWINGS

A full understanding of the disclosed concept can be gained from the following description of some example embodiments when read in conjunction with the accompanying drawings in which.

DESCRIPTION OF THE PREFERRED EMBODIMENTS

Figure 1:
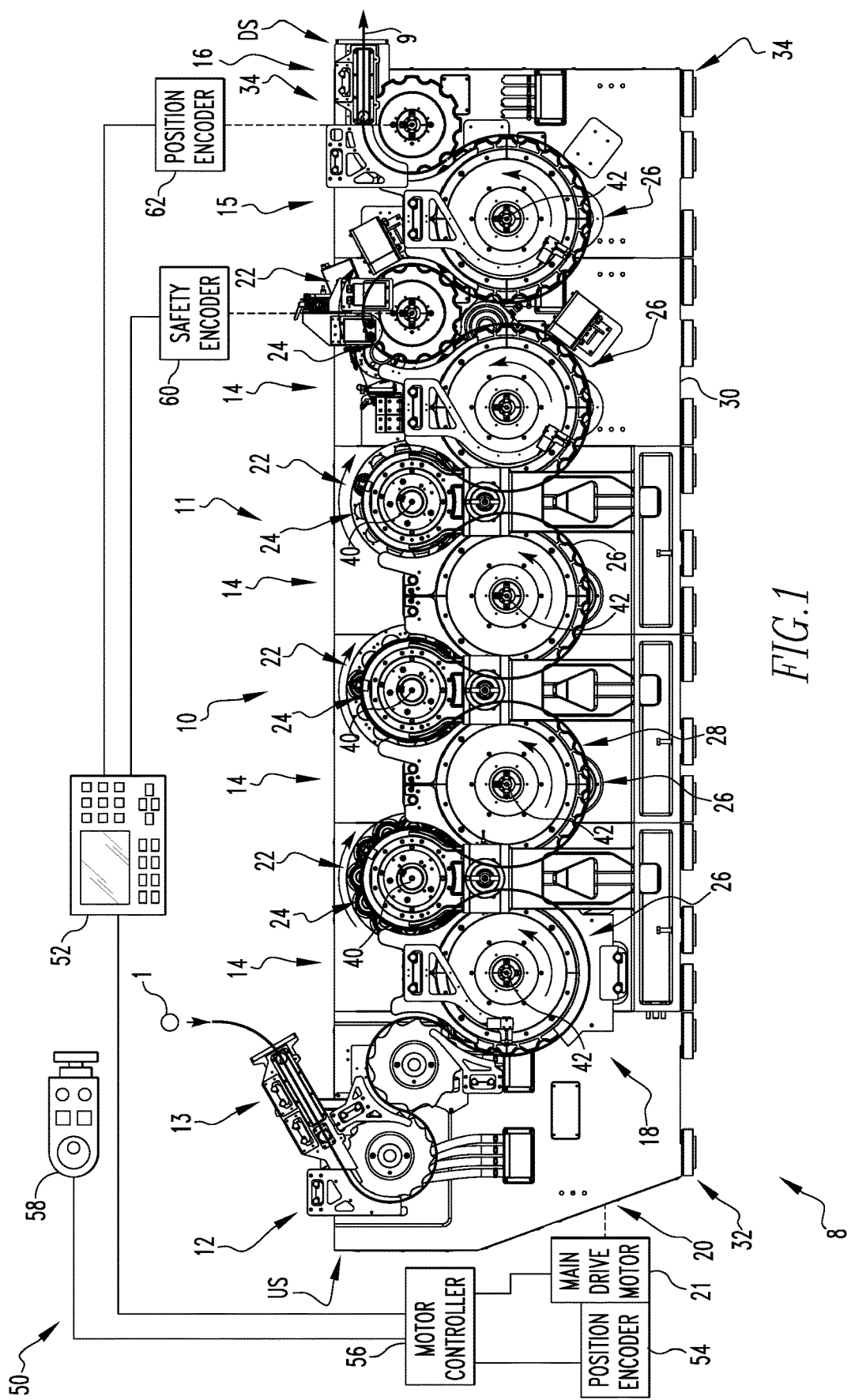
FIG. 1 is a partially schematic view of a system for performing necking operations on a can body in accordance with an exemplary embodiment of the disclosed concept.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, quantity of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut or threaded bore. Further, a passage in an element is part of the "coupling" or "coupling component(s)." For example, in an assembly of two wooden boards coupled together by a nut and a bolt extending through passages in both boards, the nut, the bolt and the two passages are each a "coupling" or "coupling component."

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are coupled in direct contact with each other. As used herein, "fixedly coupled" or "fixed"

means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As employed herein, the terms "can" and "container" are used substantially interchangeably to refer to any known or suitable container, which is structured to contain a substance (e.g., without limitation, liquid; food; any other suitable substance), and expressly includes, but is not limited to, beverage cans, such as beer and beverage cans, as well as food cans.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, a "drive assembly" means elements that are operatively coupled to the rotating shafts extending back to front in a processing module. A "drive assembly" does not include the rotating shafts extending back to front in a processing module.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

As used herein, the term "controller" shall mean a programmable analog and/or digital device (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

A partially schematic view of a system 8 for performing necking operations on a can body in accordance with an exemplary embodiment of the disclosed concept is shown in FIG. 1. System 8 includes a necker machine 10 and a positioning system 50. While a brief description of the general elements and operation of the necker machine 10 is provided herein, a detailed description of a similar necker machine and the operation thereof is provided in U.S. patent application Ser. No. 16/407,292, filed May 9, 2019 (having a common inventor with this application), the contents of which are incorporated by reference herein. It is to be appreciated that the necker machine 10 is provided for exemplary purposes only and that the disclosed concept may be applied to other necker machines. Some other examples of necker machines for which positioning systems in accordance with the concepts disclosed herein may be employed are described in, for example, without limitation, U.S. Pat. Nos. 8,464,567, 8,601,843, 9,095,888, and 9,308,570, the contents of each being incorporated by reference herein.

Figure 2:
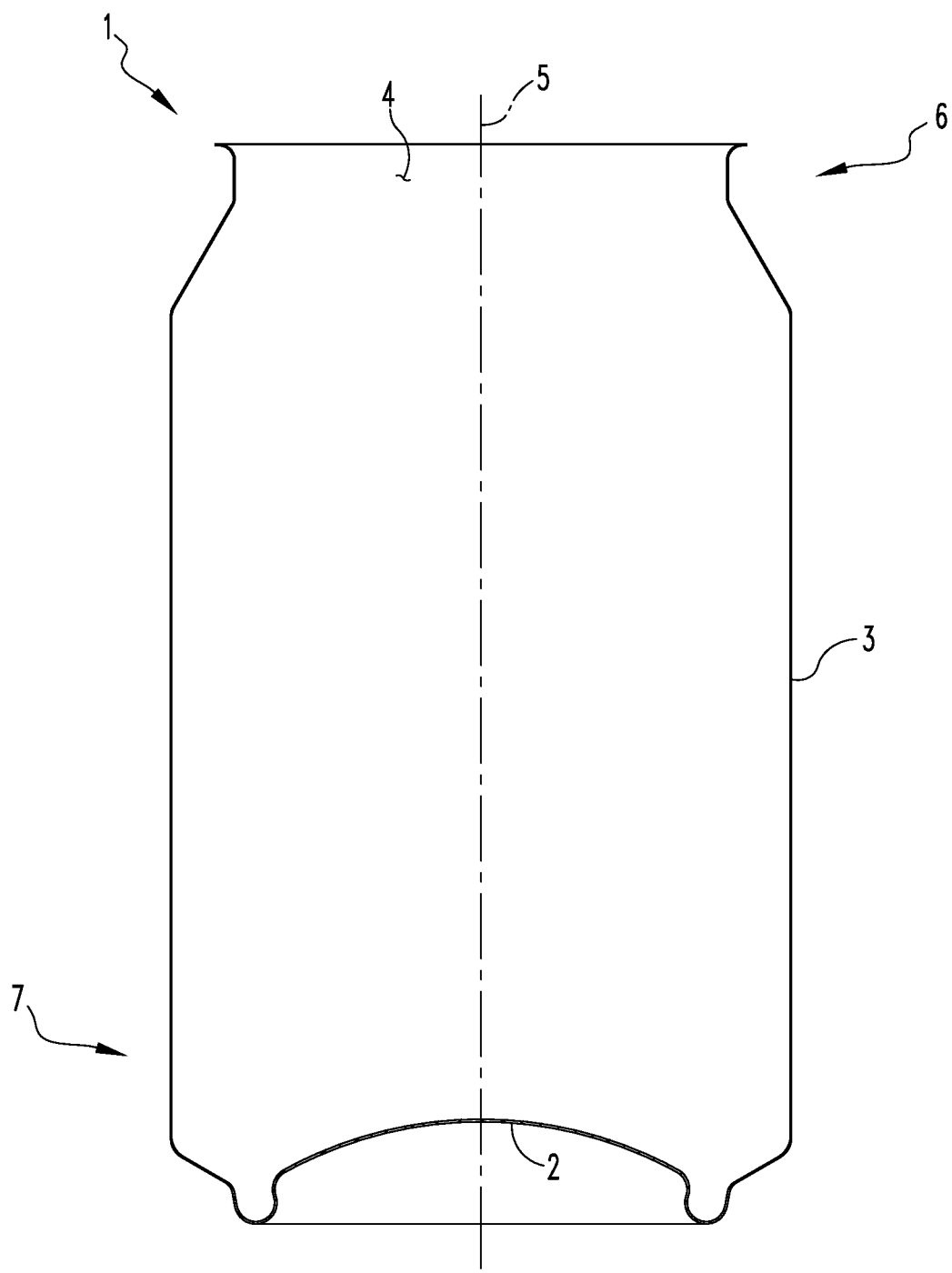
FIG. 2 is a schematic cross-sectional view of a can body such as formed, in-part, by the necker machine of the system of FIG. 1.

As previously discussed in the Background Information above, the necker machine 10 is structured to reduce the diameter of a portion of a can body 1, such as illustrated in FIG. 2. As used herein, to "neck" means to reduce the diameter/radius of a portion of a can body 1. That is, as shown in FIG. 2, a can body 1 includes a base 2 with an upwardly depending sidewall 3. The can body base 2 and can body sidewall 3 define a generally enclosed space 4. In the embodiment discussed below, the can body 1 is a generally circular and/or an elongated cylinder. It is understood that this is only one exemplary shape and that the can body 1 can have other shapes. The can body has a longitudinal axis 5. The can body sidewall 3 has a first end 6 and a second end 7. The can body base 2 is at the second end 7. The can body first end 6 is open. The can body first end 6 initially has substantially the same radius/diameter as the can body sidewall 3. Following forming operations in the necker machine 10, the radius/diameter of the can body first end 6 is smaller than the other portions of the radius/diameter at the can body sidewall 3.

Referring to FIG. 1, the example necker machine 10 generally includes a plurality of modules (shown generally at 11) for carrying out operations on a can body 1 that are coupled together in a side by side arrangement. While the example necker machine 10 includes six of such modules 11, it is to be appreciated that the quantity of modules 11 included in a given necker machine is generally dependent on details of the can body being processed/formed and the final desired geometry thereof and as such the quantity of modules 11 may be varied without varying from the scope of the disclosed concept. The plurality of modules 11 includes an infeed module 12 positioned at a first end of the necker machine 10. The infeed module 12 includes an infeed assembly 13 for receiving can bodies 1. The plurality of modules 11 also includes a plurality of forming/processing modules 14 extending side by side in a series arrangement from the infeed module 12. The plurality of modules 11 concludes with a discharge module 15 positioned at the opposite end of the necker machine from the infeed module 12 such that the plurality of processing modules 14 are bounded by the infeed module 12 and the discharge module 15. The discharge module 15 includes an exit assembly 16 for discharging necked cans from the necker machine 10. Hereinafter, the processing/forming modules 14 are identified by the term "processing modules 14" and refer to generic processing modules 14.

The processing modules 14 are disposed adjacent to each other and in series with the infeed module 12 and discharge module 15 disposed at opposite ends of the series of processing modules 14. The can bodies 1 being processed by the necker machine 10 each move from an upstream location through the series of processing modules 14 in the same sequence. Movement of the can bodies 1 through the necker machine 10 is carried out by a transfer assembly 18 that is driven by a drive arrangement 20 driven by a number of main drive motors 21 (both shown schematically). In the example shown in FIG. 1, only a single main drive motor 21 is used to drive the drive arrangement 20 and the transfer assembly 18. In the example shown in FIG. 1, a gear train such as known in the art, and thus not described in detail herein, is employed as the drive arrangement 20. It is to be appreciated that the quantity of main drive motors 21 employed as well as the particular drive arrangement 20 used in conjunction therewith may be varied without varying form the scope of the disclosed concept. For example, without limitation, U.S. patent application Ser. No. 17/021, 401 and Ser. No. 17/319,689 (filed Sep. 15, 2020 and May 14, 2021, both having a common inventor with this application), the contents of each being incorporated by reference herein, provide some other examples of drive arrangements for necker machines for which the concepts disclosed herein may be readily applied.

Continuing to refer to FIG. 1, during processing, the can bodies 1 follow a path, hereinafter, the "work path 9". That is, elements of the necker machine 10 define the work path 9 wherein can bodies 1 move from an "upstream" US location to a "downstream" DS location. As used herein, "upstream" generally means closer to the infeed module 12/infeed assembly 13 and "downstream" means closer to the discharge module 15/exit assembly 16. With regard to elements that define the work path 9, each of those elements have an "upstream" end and a "downstream" end" wherein the can bodies move from the "upstream" end to the "downstream end." Thus, as used herein, the nature/identification of an element, assembly, sub-assembly, etc. as an "upstream" or "downstream" element or assembly, or, being in an "upstream" or "downstream" location, is inherent. Further, as used herein, the nature/identification of an element, assembly, sub-assembly, etc. as an "upstream" or "downstream" element or assembly, or, being in an "upstream" or "downstream" location, is a relative term.

During operation, the processing/forming of the can body occurs in/at a rotatable turret 22 in each processing module 14. That is, the term "turret 22" identifies a generic turret. Each processing module 14 includes a rotatable starwheel 24 associated with the turret 22. Depending on the application, the starwheel 24 may be a "non-vacuum starwheel" (i.e., a starwheel that does not include, or is not associated with, a vacuum assembly, that is structured to apply a vacuum to the starwheel pockets) or alternatively a "vacuum starwheel" (i.e., a starwheel that does include, or is associated with, a vacuum assembly, that is structured to apply a vacuum to the starwheel pockets) without varying from the scope of the disclosed concept. Further, each processing module 14 typically includes one turret 22 and one starwheel 24.

The transfer assembly 18 is structured to move the can bodies 1 between adjacent processing modules 14 as well as from the infeed module 12 and to the discharge module 15. The transfer assembly 18 includes a plurality of rotatable starwheels 26, with each starwheel 26 being a part of a respective processing module 14, infeed module 12, or discharge module 15. Similar to starwheels 24, depending on the application starwheels 26 may be of a "vacuum" or "non-vacuum" type without varying from the scope of the disclosed concept.

It is noted that the plurality of processing modules 14 may be structured to neck different types of can bodies 1 and/or to neck can bodies in different configurations. Thus, the plurality of processing modules 14 are structured to be added and removed from the necker machine 10 depending upon the need for the particular application. To accomplish this, the necker machine 10 includes a frame assembly 30 to which the plurality of processing modules 14 are removably coupled. Alternatively, the frame assembly 30 includes elements incorporated into each of the plurality of processing modules 14 so that the plurality of processing modules 14 are structured to be temporarily coupled to each other. The frame assembly 30 has an upstream end 32 and a downstream end 34. Further, the frame assembly 30 includes elongated members, panel members (neither numbered), or a combination of both. As is known, panel members coupled to each other, or coupled to elongated members, form a housing. Accordingly, as used herein, a housing is also identified as a "frame assembly 30."

When necker machine 10 is operated, the infeed assembly 13 feeds individual can bodies 1 into the transfer assembly 18 which moves each can body 1 sequentially through each of the processing modules 14 from the most upstream processing module 14 to the most downstream processing module 14. More particularly, each can body 1 moves from a starwheel 26, to a starwheel 24, to a turret 22 where a forming operation occurs, back to the aforementioned starwheel 24, and on to the next downstream starwheel 26. Generally, each processing module 14 is structured to partially form the can body 1 so as to gradually reduce the cross-sectional area of the can body first end 6 (FIG. 2) as the can body 1 moves through the processing modules 14. The processing modules 14 include some elements that are unique to a single particular processing module 14, such as, but not limited to, a specific die. Other elements, e.g., the turret 22 and starwheels 24, 26 of the processing modules 14 are common to all, or most, of the processing modules 14.

Such process continues until the can body 1 has passed through all of the processing modules 14 along the work path 9 and then exits the necker machine 10 via the exit assembly 16.

In order to move the can body 1 through the example necker machine 10, each of the turrets 22 and starwheels 24 are rotated in a clockwise direction at a first rotational speed by respective processing or primary drive shafts 40 while each of the starwheels 26 are rotated in a counter-clockwise direction at a second rotational speed by respective transfer or secondary drive shafts 42. Such rotation of each of the primary and secondary drive shafts 40, 42 of each processing module 14 is provided by the drive arrangement 20, and more particularly by the number of main drive motors 21 thereof. For descriptive purposes herein, all of the components of the necker machine 10 driven by the drive arrangement 20 (i.e., the infeed assembly 13, the exit assembly 16, the transfer assembly 18, the turrets 22, the starwheels 24, the starwheels 26, the drive shafts 40, the drive shafts 42, as well as any other components described or not described herein) shall collectively be referred to as the "processing arrangement".

As previously discussed in the Background Information section herein, when performing maintenance on a can necking machine, such as necker machine 10, it is often required that the aforementioned processing arrangement of the necker machine 10 be positioned in a particular way so that the particular component(s) requiring attention are positioned as needed (e.g., for best access, etc.). Unlike previous arrangements which utilized only a manual mechanism on the rear of the machine that allowed for an operator to selectively position the movable components by winding the machine by hand, embodiments of the disclosed concept improve upon such arrangement by providing an automatic and/or manual electronic winding mechanism. In most applications, such electronic winding mechanism will be in addition to, and thus not completely replace the previous manual mechanism in case the machine would require maintenance when electrical power is unavailable (e.g., power outage, initial set-up, etc.). However, in some applications, the electronic winding mechanism may be used in place of the previous manual mechanism. In the example shown in FIG. 1 such electronic winding functionality is provided by the positioning system 50.

Positioning system 50 includes a controller, which in the example embodiment shown in FIG. 1, is in the form of a human machine interface (HMI 52) having input keys, switches, or other electrical or electromechanical input means (not numbered) such as commonly known in the art. In addition, the HMI may include visually and/or audibly detectable output means such as is also commonly known in the art. HMI 52 is typically located on or near necker machine 10 and may also be employed to control basic operating functions of the necker machine 10. Positioning system 50 further includes a position encoder 54 (shown schematically) positioned about the output shaft (not numbered) of the main drive motor 21 of the necker machine 10 for providing information regarding the particular rotational positioning/displacement of the output shaft. In the example shown in FIG. 1, position encoder 54 is a rotary encoder such as commonly known to those skilled in the art, however it is to be appreciated that other suitable arrangement(s) for determining/monitoring the rotational positioning/displacement of the output shaft of the main drive motor 21 may be employed without varying from the scope of the disclosed concept. In the example shown in FIG. 1, the position encoder 54 is in communication with a local motor controller 56 (shown schematically) provided on or near the drive motor 20. The local motor controller 56 in turn is in communication with the HMI 52. In such arrangement, the motor controller 56 controls operation of the main drive motor 21 based on instructions received from the HMI 52. Alternatively, in some embodiments the HMI 52 may function as the motor controller 56 and directly control the main drive motor 21 and receive the information from the position encoder 54, thus eliminating the need for the separate motor controller 56.

Positioning system 50 further includes a second position encoder 62 (shown schematically) positioned at a location along the processing arrangement and in communication with one or both of the HMI 52 and/or the motor controller 56, The second position encoder 62 is preferably positioned as far from where main drive motor 21 drives the drive arrangement 20. In the example shown in FIG. 1 the second position encoder 62 is positioned to monitor the angular positioning of the drive shaft (not numbered) of the exit assembly 16 however, it is to be appreciated that the second position encoder 62 may be positioned to monitor other components of the processing arrangement without varying from the scope of the disclosed concept. The second position encoder 62 provides the current positioning of the processing arrangement relative to the remainder of the necker machine 10. In other words, the second position encoder 62 provides the angular positioning of a known rotatable component of the processing arrangement relative to a known reference position, thus providing the Mil 52 and/or the motor controller 56 with sufficient information to determine the position of the other components in the timed processing arrangement.

In order to ensure safe operation of the positioning system 50, the positioning system 50 typically (although not necessarily) includes a safety encoder 60 (shown schematically), such as commonly known by those of ordinary skill in the art, in communication with one or both of 52 and or motor controller 56, The safety encoder 60 is positioned to monitor the speed of a rotating component somewhere within the processing arrangement of the necker machine 10 in order to provide an indication in the event that processing arrangement experiences a pre-determined unsafe acceleration and/or unsafe speed and thus should be stopped. In the example shown in FIG. 1, the safety encoder 60 is shown monitoring the shaft (not numbered) of the turret 22 closest to the discharge module 15, however, it is to be appreciated that the safety encoder 60 may be positioned monitoring another elements in the processing arrangement without varying from the scope of the disclosed concept.

Two operational modes are provided by the positioning system 50 that were previously not capable by the hand winding arrangements: an automatic positioning mode and a manual positioning mode. In the automatic positioning mode, a user (e.g., an operator and/or maintenance person) submits a position request related an element of the processing arrangement of the necker machine 10 via the HMI 52. For example, such request may consist of the user selecting a particular turret pocket on a particular turret 22 to be positioned in a pre-determined service position. Using the starting position information provided by the second position encoder 62, the HMI 52 and/or the motor controller 56 (depending on the particular embodiment), determines the rotational displacement of the shaft of the main drive motor 21 needed to move the processing arrangement to the desired positioning indicated by the user. The main drive motor 21 is then driven via the motor controller 56 (or the HMI 52 depending on the particular embodiment) according to feedback provided by the position encoder 54 monitoring the angular displacement of the shaft of the main drive motor 21 until the desired rotational displacement of the shaft previously determined by the HMI 52 and/or the motor controller 56 is obtained (as measured by the position encoder 54). As an alternative to using the HMI 52 for providing/inputting the desired position, the input may instead be provided via a remote input device 58 (that may also be provided as a component of positioning system 50) that is in communication (e.g., via any suitable wired or wireless means) with one or both of HMI 52 and/or motor controller 56 (shown in FIG. 1). In the example shown in FIG. 1 the remote input device 58 is an electronic handwheel that includes an E-Stop, an enable button and speed adjustment buttons (e.g., + and −) (all not numbered). Use of such a remote input device 58 allows for the user to observe movement of the processing arrangement of the necker machine 10 from a preferred vantage point which may not otherwise be practical or possible using only the HMI 52 (and is definitely not possible using known hand winding arrangements). Observing the movement of the processing arrangement from a preferred vantage point or points (since the user can generally move freely, move during such operation) can be very useful in troubleshooting the processing arrangement and the necker machine 10 in general.

In the manual positioning mode, the user inputs a desired speed and direction for which the processing arrangement is to be moved, and thus correspondingly the main drive motor 21 is to be operated. Such input is typically made via the remote input device 58, once again so that the user can observe movement of the components of the necker machine 10. Based on this input, the motor controller 56 (or the HMI 52) operates the main drive motor 21 according to feedback of the rotational speed from the position encoder 54 which is used for closed loop speed control of the main drive motor 21. Operation of the main drive motor 21 continues until an indication by the operator that the processing arrangement of the necker machine 10 have reached the desired positioning. Such indication may be in the form of a distinct input provided by the user or alternatively by the user ceasing to provide an input. For example, in one embodiment of the disclosed concept (such as shown in FIG. 1) the remote input device 58 includes a knob or dial (not numbered) that the user may rotate a desired amount in either of two rotatable directions from a stop position, with the rotatable directions corresponding to movement directions of the processing arrangement (and thus drive directions of the main drive motor 21) and the rotational displacement in either direction corresponding to desired speeds of the processing arrangement (and thus drive speeds for the main drive motor 21). In such example, the main drive motor 21 is operated (using the closed loop feedback from the position encoder 54) in the direction and speed corresponding to the input provided by the user while the knob is held in a displaced position by the user. Upon the knob returning to the stop position (either by the user returning the knob to the initial position or releasing the knob and it automatically returning to the initial position) operation of the main drive motor 21 ceases, and along with it so does movement of the processing arrangement. In the manual positioning mode the safety encoder 60 monitors the acceleration/speed of the processing arrangement to ensure an unsafe condition does not occur. In the manual positioning mode, the second position encoder 62 monitors the positioning of the processing arrangement so that the actual position of the processing arrangement is known for when the automatic positioning mode is next used.

Figure 3:
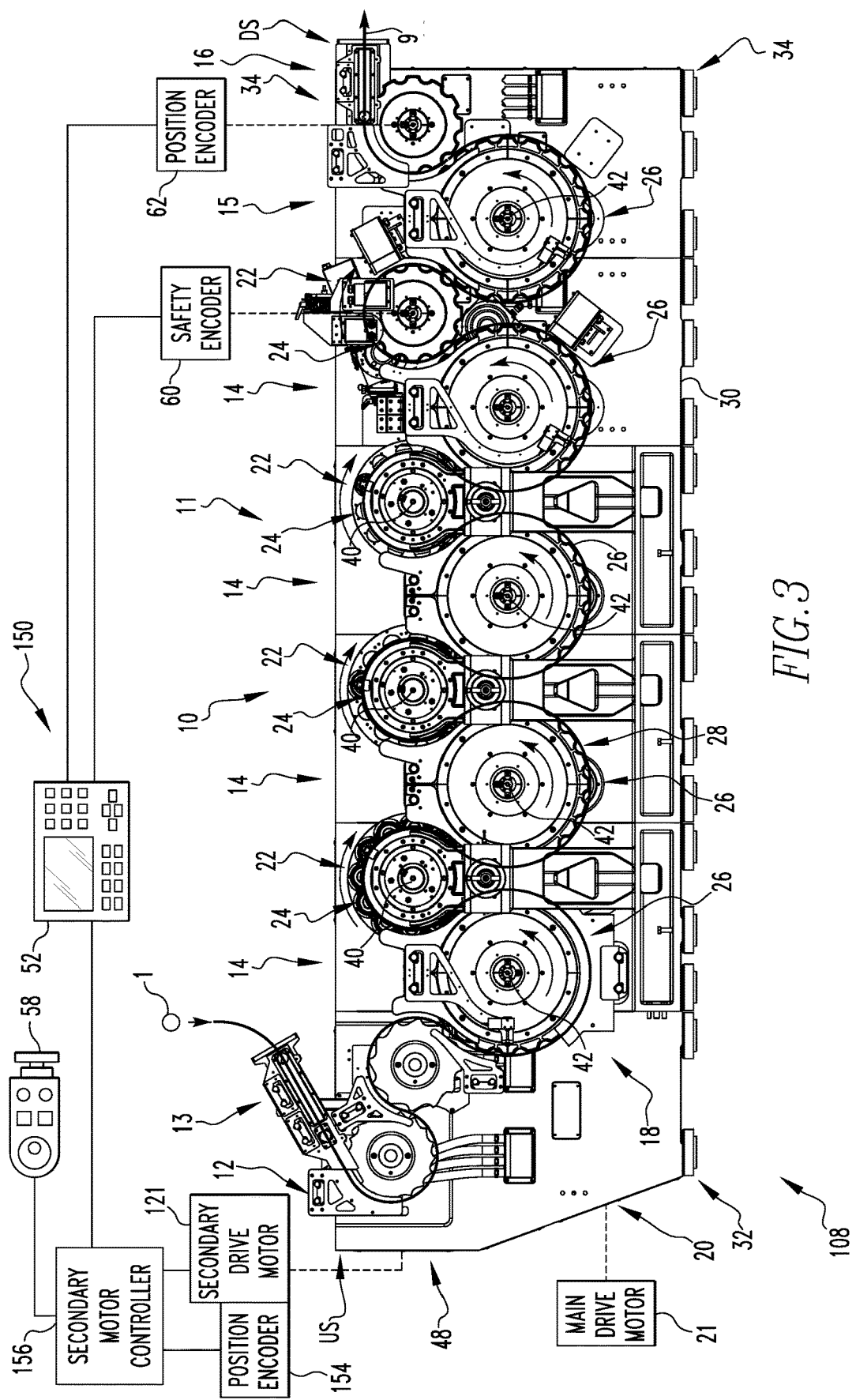
FIG. 3 is a partially schematic view of a system for performing necking operations on a can body in accordance with another exemplary embodiment of the disclosed concept.

A partially schematic view of a system 108 for performing necking operations on a can body in accordance with another exemplary embodiment of the disclosed concept is shown in FIG. 3. System 108 includes a necker machine 10 (such as previously discussed in regard to FIG. 1) and a positioning system 150 (in accordance with another example embodiment of the disclosed concept). Positioning system 150 is of a similar arrangement, and thus does/may include similar elements, as positioning system 50 previously discussed except positioning system 150 does not utilize the main drive motor 21 to move the drive arrangement 20 and the processing arrangement. Instead, the positioning system 150 utilizes a secondary drive motor 121 (shown schematically) that is operatively coupled to the hand winding arrangement (shown schematically generally as 48) of the necker machine 10. Secondary drive motor 121 is not used to drive the drive arrangement 20 during regular processing operations carried out by the necker machine 10 and thus is of a smaller size/power than main drive motor 21. Similar to the arrangement in regard to the main drive motor 21 of the positioning system 50, the secondary drive motor 121 may be controlled/driven by one or both of the HMI 52 and/or a secondary motor controller 156 (shown schematically), with either arrangement using a position encoder 154 (shown schematically) positioned about the shaft (not numbered) of the secondary drive motor 121 (similar to the arrangement of the position encoder 54 and the main drive motor 21 previously discussed in regard to FIG. 1) and the second encoder 62 (positioned as previously discussed in FIG. 1). Although shown included in the arrangement shown in FIG. 3, the safety encoder 60 is not required and typically not included as a part of positioning system 150 due to the greatly reduced power output of the secondary motor 121. The same two operational modes previously discussed in conjunction with the embodiment of the positioning system 50 shown in FIG. 1 may be carried out in a similar manner with the positioning system 150, and thus are not discussed in detail herein.

From the foregoing example embodiments it is thus to be appreciated that embodiments of the concept disclosed herein provide arrangements for electrically positioning the moving components of a necker machine in a desired position as otherwise previously not available. Such arrangements improve the safety in regard to working on such machines while reducing downtime.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concepts which are to be given the full breadth of the claims appended and any and all equivalents thereof.

What is claimed is:

1. A system for performing necking operations on a can body, the system comprising:
   a necker machine comprising:
      a frame,
      a processing arrangement having a plurality of components movable relative to the frame, the processing arrangement structured to perform the necking operations on the can body, and
      a drive motor having a shaft operatively coupled to the processing arrangement for moving the processing arrangement relative to the frame; and
   a positioning system comprising:
      an encoder associated with the drive motor for monitoring a rotational displacement of the shaft; and
      a controller in communication with the encoder and the drive motor, wherein the controller is structured and programmed to:
         receive an input from a user, the input being indicative of a desired movement of the processing arrangement relative to the frame, and
         operate the drive motor using feedback from the encoder such that the desired movement of the processing arrangement is achieved, wherein:
      the encoder comprises a first encoder,
      the positioning system further comprise a second encoder associated with a first component of the processing arrangement for monitoring a rotational position of the first component with respect to the frame,
      the second encoder is in communication with the controller for communicating the rotational position of the first component to the controller,
      the controller is structured and programmed to determine the rotational position of other components of the processing arraignment from the rotational position of the first component of the processing arrangement,
      the desired movement of the processing arrangement corresponds to a desired final rotational positioning of a particular component of the processing arrangement relative to the frame, and
      the controller is further programmed to:
         determine an initial rotational position of the particular component from the rotational position of the first component provided by the second encoder,
         determine a rotational displacement between the desired rotational positioning of the particular component and the initial rotational position of the particular component, and
         operate the drive motor using the feedback from the first encoder until the rotational displacement has been achieved according tot eh feedback from the first encoder.

2. The system of claim 1, wherein the controller comprises a human machine interface.

3. The system of claim 2, wherein the positioning system further comprises a human machine interface structured to receive the input from the user, and wherein the controller comprises a motor controller in communication with the human machine interface.

4. The system of claim 1, wherein the desired movement of the processing arrangement comprises a direction and magnitude of movement of a component of the processing arrangement relative to the frame.

5. The system of claim 1, wherein the positioning system further comprises a remote input device in communication with the controller, and wherein the remote input device is structured to receive the input from the user and provide the input to the controller.

6. The system of claim 5, wherein the remote input device comprises a knob or dial that is structured to be rotated by the user a rotational displacement in either of two rotatable directions from a stop position, wherein each rotatable direction corresponds to a movement direction of portions of the processing arrangement, and wherein the rotational displacement in either direction corresponds to a speed of the portions of the processing arrangement.

7. The system of claim 6, wherein the controller is further structured and programmed to operate the drive motor only while the knob or dial of the remote input device is rotated from the stop position by the user.

8. The system of claim 1, wherein the drive motor comprises a main drive motor that is sized and configured to move the processing arrangement relative to the frame while carrying out normal necking operations.

9. The system of claim 1, wherein:
the drive motor comprises a secondary drive motor,
the system further comprises a main drive motor operatively coupled to the processing arrangement that is configured to move the processing arrangement relative to the frame while carrying out normal necking operations.

10. The system of claim 1, wherein the desired movement of the processing arrangement corresponds to a desired final positioning of a component of the processing arrangement relative to the frame.

11. The system of claim 1, wherein the drive motor comprises a main drive motor that is sized and configured to move the processing arrangement relative to the frame while carrying out normal necking operations.

12. The system of claim 1, wherein the drive motor comprises a secondary drive motor, wherein the system further comprises a main drive motor operatively coupled to the processing arrangement that is sized and configured to move the processing arrangement relative to the frame while carrying out normal necking operations, and wherein the secondary drive motor is of a lessor size than needed to carry out normal necking operations.

13. The system of claim 1, wherein the positioning system further comprises a safety encoder in communication with the controller, and wherein the safety encoder is associated with a component of the processing arrangement for monitoring one or both of a rotational acceleration and/or rotational speed of the component with respect to the frame.

* * * * *